United States Patent

Matsuura

[15] 3,638,301

[45] Feb. 1, 1972

[54] METHOD FOR MANUFACTURING A VARIABLE CAPACITANCE DIODE

[72] Inventor: Shigeo Matsuura, Yokohama, Japan

[73] Assignee: Hitachi, Ltd., Chiyoda-ku, Tokyo, Japan

[22] Filed: June 29, 1970

[21] Appl. No.: 50,810

[30] Foreign Application Priority Data

June 27, 1969 Japan....................................44/50411

[52] U.S. Cl...................................29/589, 148/175, 317/234

[51] Int. Cl...........................................B01j 17/00, H01l 7/02

[58] Field of Search............................29/589; 148/175, 191; 317/234 U

[56] References Cited

UNITED STATES PATENTS

| | | | |
|---|---|---|---|
| 3,473,977 | 10/1969 | Skouson et al | 148/175 |
| 3,512,056 | 5/1970 | Chu et al | 148/175 X |
| 3,544,863 | 12/1970 | Price et al | 148/175 X |
| 3,560,809 | 2/1971 | Terakado | 317/234 U |

*Primary Examiner*—John F. Campbell
*Assistant Examiner*—W. Tupman
*Attorney*—Craig, Antonelli & Hill

[57] ABSTRACT

A variable capacitance diode having an improved stepped junction therein formed by epitaxially depositing a $P^-$ type layer on a N+ silicon substrate, forming an N+ type layer on the $P^-$ type layer, heating the produced segment to a high temperature to cause the impurities contained in the N+ type layer and the N+ type substrate to diffuse into the $P^-$ type layer, whereby the $P^-$ type layer is converted to an $N^-$ type layer, and thereafter forming a P+ type layer on the N+ type layer.

8 Claims, 13 Drawing Figures

INVENTOR.
SHIGEO MATSUURA
BY
Craig, Antonelli, Stewart & Hill
ATTORNEYS

INVENTOR
SHIGEO MATSUURA
BY
Craig, Antonelli, Stewart & Hill
ATTORNEYS

METHOD FOR MANUFACTURING A VARIABLE CAPACITANCE DIODE

This invention relates to a method for manufacturing a variable capacitance diode, especially, to a method for manufacturing a diode having a super stepped junction. In a variable capacitance diode where the junction capacitance of the semiconductor PN-junction is changed by an impressed voltage of reversed direction, an abrupt change in the distribution of the impurity concentration is needed in order to obtain a large capacitance variation. The types of junctions in the impurity concentration distribution are as follows; graded type, stepped type and so-called super stepped type having a high variation rate thereof and formed so as to decrease the impurity concentration away from the major junction surface.

The semiconductor region having low-impurity concentration formed so as to decrease the impurity concentration away from the major junction surface is not directly connected with an electrode of a super stepped junction diode, but usually, for elevating the selectivity Q of said diode, is formed to have a required thickness for the capacitance variation and connected with a semiconductor region of the same conductivity type of low resistance (high-impurity concentration).

Usually in a method for forming a super stepped junction, for example, the following technique has been employed: an $N^-$ epitaxial layer of low-impurity concentration is formed on an $N^+$ type semiconductor substrate of high-impurity concentration, and a high concentration $N^+$ layer is diffused or an $N^+$ epitaxial layer is grown on the $N^-$ epitaxial layer, and an opposite conductivity tube $P^+$ layer is diffused. According to this method, however, autodoping from the $N^+$ type semiconductor substrate is caused in the coming heat treatment and the $N^-$ type impurity concentration of the $N^-$ epitaxial layer becomes too high, the abrupt change in the impurity concentration distribution and the quantity thereof are restricted, and the capacitance variation and quantity thereof is, therefore, unable to be enlarged more than a certain degree.

An object of this invention is to provide an improved variable capacitance diode.

Another object of this invention is to obtain a super stepped junction which is able to decrease the effect of autodoping by improving above-mentioned points.

A feature of this invention involves initially forming a low-impurity concentration layer of an opposite conductivity type to the desired conductivity type for a super stepped junction and then heating the layer of said reversed conductivity type to cause autodoping from said layer and a high-impurity concentration layer adjoining to said layer of said reversed conductivity type, whereby the layer of the reversed conductivity type is converted to that of the desired conductivity type.

The above and other objects and features of this invention will be made more apparent from the preferred embodiments of this invention taken in conjunction with the accompanying drawings, in which.

A detailed description of this invention according to one embodiment is as follows. Although the following description is for the usual case of using silicon for a semiconductor material and a layer of N-type conductivity having high carrier mobility and being able to enlarge the selectivity Q for said impurity concentration layer, there is no special reason for selecting them and, if needed, other well-known semiconductor materials and the conductivity type may be selected.

EXAMPLE 1

A method for manufacturing a variable capacitance diode according to this invention is described in conjunction with FIGS. 1a through 1d, FIGS. 2a through 2d and FIG. 3.

Figure 1A:
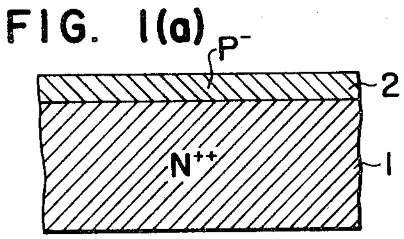
FIGS. 1a through 1d are cross-sectional views of the essential part of a semiconductor body in each manufacturing step for explaining a manufacturing process for a variable capacitance diode according to this invention.
Figure 2A:
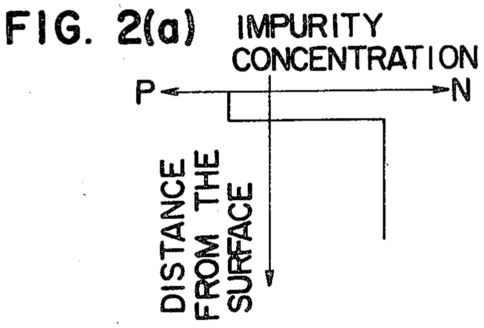
FIGS. 2a through 2d are charts for showing the distribution of the impurity concentration in the semiconductor body in each step corresponding to FIGS. 1a through 1d.

Step A:

A single crystalline silicon substrate 1 of low resistance and N-type, namely $N^{++}$ type, is prepared and a silicon layer of the opposite conductivity type having a relatively low-impurity concentration, namely $P^-$ type layer 2, is formed on the major surface of said $N^{++}$ type silicon substrate 1 as shown in FIG. 1a. Said $P^-$ type layer 2 is formed by a conventional epitaxial growing technique by thermal decomposition of inorganic or organic silane. The distribution of impurity concentration in the silicon body thus produced is shown in FIG. 2a wherein the axis of abscissas illustrates the impurity concentration N- and P-type impurities and the axis of coordinates illustrates the distance from the surface of the body.

In this example it is desirable that the $N^{++}$ type substrate has a specific resistance of not more than about 0.02Ω-cm., in other words, an impurity concentration of not less than $2\times10^{18}$ atoms/cm.$^3$ and the $P^-$ epitaxial layer has a specific resistance of 0.5 to 3.0Ω-cm, in other words, an impurity concentration of about $3\times10^{15}$ to $4\times10^{16}$ atoms/cm.$^3$ and thickness of 1.0 to 5.0$\mu$. According to this specific embodiment, an antimony doped silicon substrate having the specific resistance of 0.005Ω-cm. was used and a boron doped epitaxial silicon layer of about 3$\mu$ thickness and with specific resistance of about 1Ω-cm. was formed on the substrate by thermally decomposing silicon tetrachloride at about 1,200° C. for 2 to 3 minutes.

It is noted that said $P^-$ type layer 2 is the layer which is to be compensated by auto-doping N-type impurities from the $N^{++}$ substrate 1 and an $N^+$ type silicon layer of low resistance (high-impurity concentration) formed in the following step B and to be converted to $N^-$ type layer when a super stepped junction in this example is obtained.

Figure 1B:
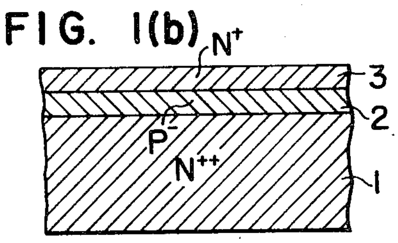

Step B:

Next, an N-type layer 3 of low resistance (or high-impurity concentration) 3 is formed at the surface of said $P^-$ type layer 2 by conventional impurity diffusing techniques, or epitaxially growing techniques as shown in FIG. 1b.

Figure 2B:
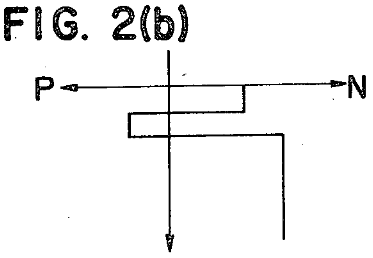

The distribution of impurity concentration in the silicon body thus produced is shown in FIG. 2b.

In this example it is desirable that the $N^+$ type layer has a specific resistance of 0.6 to 0.001Ω-cm., or an impurity concentration of about $10^{16}$ to $6\times10^{18}$ atoms/cm. According to this specific embodiment, a phosphorus doped silicon layer was epitaxially deposited on the $P^-$ silicon layer 2 with a thickness of 1 to 3$\mu$ by thermally decomposing silicon tetrachloride at about 1,200° C. for 2 to 3 minutes. Antimony may be doped into the silicon layer 3 instead of phosphorus.

Step C

Figure 1C:
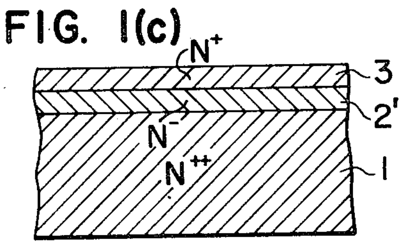

The body next receives a heat treatment by heating the body to a high temperature for a sufficient time to convert the conductivity type of the $P^-$ type layer 2 to $N^-$ type as shown in FIG. 1c by autodoping of the N-type impurities contained in the $N^{++}$ type substrate 1 and the $N^+$ type silicon layer 3. In this example it is desirable that the newly formed $N^-$ type layer 2' has a specific resistance of about 2 to 5Ω-cm. According to this specific embodiment the body was heated to about 1,200° C. for 20 to 30 minutes to obtain such a converted layer 2'. If antimony is used to form the $N^+$ type layer 3 in the step B, the body should be heated to about 1,200° C. for 4 to 5 hours.

Figure 2C:
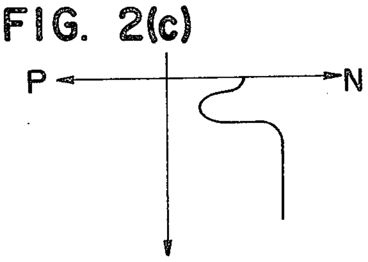

The distribution of impurity concentration in the body thus produced is shown in FIG. 2c.

Step D

Figure 1D:
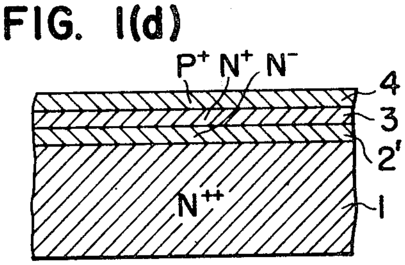

Then a $P^+$ type layer 4 of high-impurity concentration is formed at the surface of said $N^+$ type layer 3 as shown in FIG. 1d by conventional diffusing techniques or epitaxially growing techniques, or is partially formed by using selectively treating techniques if needed. In this specific embodiment, boron was deposited on the $N^+$ layer 3 heated at a temperature of about 1,030° C. for 1 hour in a nitrogen atmosphere and then the body thus formed, was heated to about 1,000° C. for 2 to 3 hours in oxygen atmosphere to diffuse the deposited boron into the $N^+$ layer, whereby a $P^+$ type layer 4 was formed therein. In this step, a silicon oxide film (not shown) of 5,000 to 10,000A thickness was formed at the surface of the $P^+$ type layer 4.

Instead of diffusing boron into the $N^+$ type layer 3 to form the $P^+$ type layer to form the $P^+$ type layer therein, a $P^+$ type silicon layer in which boron is doped may be epitaxially deposited on the $N^+$ type layer to a thickness of about 2$\mu$ by thermally decomposing silicon tetrachloride at about 1,200° C. for 2 minutes.

Figure 2D:
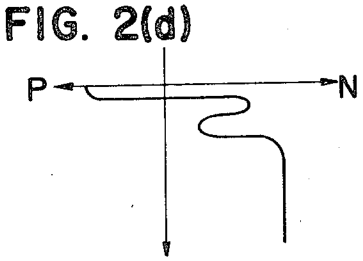

As shown in FIG. 2*d*, a splendid concentration distribution of impurities is obtained in the body thus produced through steps A to D. A stepped PN-junction is obtained between the $P^+$ layer 4 and the $N^+$ layer 3, and a special region having a distribution in impurity concentration decreasing as leaving from the stepped junction is obtained in the $N^+$ layer 3 and $N^-$ layer 2'.

Figure 3:
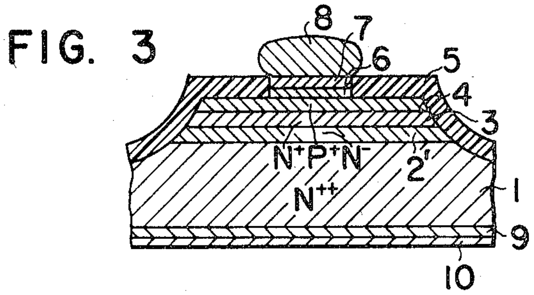
FIG. 3 shows a cross-sectional view of a variable capacitance diode manufactured by the method explained in FIGS. 1a through 1d.

FIG. 3 shows a cross-sectional view of an improved variable capacitance diode according to this invention. Such a diode is fabricated by selectively removing the body shown in FIG. 1*d* to make a moat extending to the substrate by means of conventional selective etching techniques, forming an insulating film such as silicon oxide, silicon oxide and silicon nitride, or lead-silicate glass on the surface of the body, forming a hole in the film to expose the surface of the $P^+$ type layer 4, depositing metallic material such as gold or gold-gallium alloy to form an ohmic contact layer 6, further depositing silver on the contact layer 6 to form a second metal layer 7, and plating silver thick on the second metal layer 7 to form a bump 8 thereon. On the other side of the body, gold-antimony layer 9 is deposited on the surface of the $N^{++}$ type substrate by vacuum evaporation method and silver layer 10 is deposited on the gold-antimony layer 9. The above electrode structure and metallic material are desirable in the variable capacitance diode according to this invention for obtaining small contacting resistance and improved electrical characteristics in the forward direction and for easily connecting the electrodes to leadout means.

Further, by making said $P^-$ type impurity layer 2 and $N^+$ layer 3 so as to have a proper proportion in the distribution of impurity concentration, rather than a uniform distribution thereof, a super stepped junction having a more desirable character may be formed.

Although in the above example the heat treatment in step C was done independently or separately from step B and step D, it should be understood that the heat treatment in step C may be done simultaneously in step B and/or step D. For example, a semiconductor body having such a structure as shown in FIG. 1*c* may be obtained by a method described in the following example 2.

EXAMPLE 2

Another method for manufacturing a variable capacitance diode according to this invention will be example herein through FIGS. 1*a*, 1*c* and 1*d*.

A $P^-$ type boron doped silicon layer 2 of about 5$\mu$ thickness having a specific resistance of about 3Ω-cm. is deposited on the surface of an $N^{++}$ type silicon substrate 1 having a specific resistance of about 0.0001$\mu$-cm. as shown in FIG. 1*a* by conventional epitaxial growing techniques.

Then the body thus produced is heated up to about 1,200° C. in an antimony atmosphere for 5 hours and antimony is diffused into the $P^-$ type layer 2, whereby an N+ type layer 3 of about 3$\mu$ thickness is formed therein and the $P^-$ type layer 2 is converted to an $N^-$ type layer 2' as shown in FIG. 1*c* since N-type impurities contained in the $N^{++}$ type substrate 1 and the $N^+$ type layer 3 are diffused into the $P^-$ type layer 2 due to the heat treatment in such high temperature.

Then, as shown in FIG. 1*d*, a $P^+$ type silicon layer of about 2 thickness is deposited on the surface of the $N^+$ type layer 3 by a conventional epitaxially growing method as explained in the example 1.

Thereafter, metal electrodes are provided as shown in FIG. 3 by a method as described in the above mentioned example 1.

EXAMPLE 3

Now, another method for manufacturing a variable capacitance diode will be explained hereinbelow through FIGS. 4*a* to 4*d*.

Figure 4A:
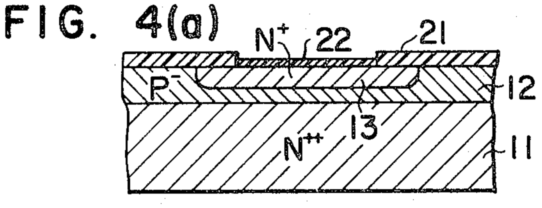
FIGS. 4a through 4d are cross-sectional views of a semiconductor body in each manufacturing step for explaining another method for manufacturing a variable capacitance diode according to this invention.

At first, as shown in FIG. 4*a*, a $P^-$ type layer 12 of about 4$\mu$ thickness having a specific resistance of about 1Ω-cm. is epitaxially deposited on a $N^{++}$ type silicon substrate 11 of about 0.002Ω-cm., a silicon oxide film 21 is formed on the $P^-$ type layer 12 by conventional oxidizing method, an $N^+$ type region 13 is formed in the $P^-$ type layer 12 by selectively diffusing an N-type impurity such as phosphorus, antimony or arsenide through a hole formed in the film 21, and a silicon oxide film 22 are formed on the diffused region 13.

Figure 4B:
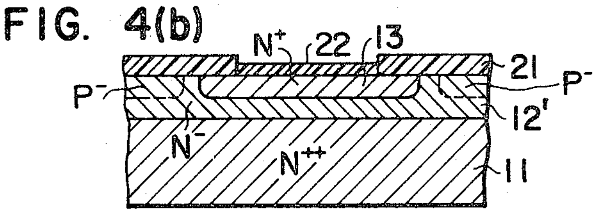

Then, the body thus produced is heated to a temperature not less than about 1,100° C. for a sufficient time to cause the N-type impurities contained in the $N^+$ layer 13 and the $N^{++}$ substrate 11 to be diffused into the $P^-$ type layer 12 in order to convert the $P^-$ type layer 12 to an $N^-$ type layer 12' as shown in FIG. 4*b*, for example, for about 2 hours at 1,150° C. It is noted that in this step some parts of the $P^-$ type layer 12 may remain therein without being converted into the conductivity type as shown in FIG. 4*b*.

Figure 4C:
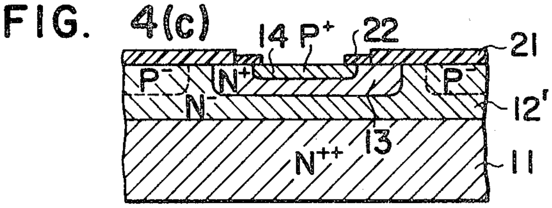
Figure 4D:
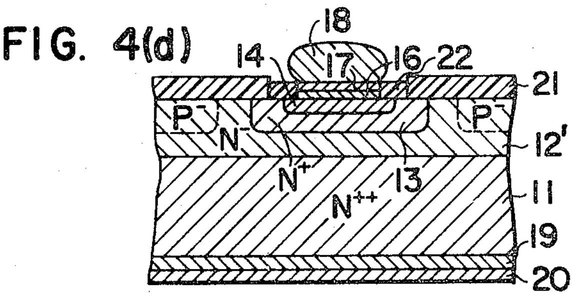

Then, as shown in FIG. 4*c*, a hole is formed in the silicon oxide film 22 and a $P^+$ type layer 14 is formed by selectively diffusing an N-type impurity such as phosphorus, antimony or arsenide into the $N^+$ type layer 13 through the hole.

Thereafter, metal electrodes 16 to 20 are provided on the surface of the $P^+$ type layer 14 and the substrate 11 by means as described in the example 1.

As explained according to the embodiments, according to this invention the effect of autodoping is removed or extremely lessened by forming a layer of an opposite conductivity type, namely $P^-$ type layer 2 or 12, on the substrate of high-impurity concentration, and a variable capacitance diode having an abrupt change in the distribution of impurity concentration at the super stepped junction and large capacitance variation is obtained.

The invention being thus described, it will be obvious that the same may be varied in many ways. Such variations are not to be regarded as a departure from the spirit and scope of the invention, and all such modifications as would be apparent to one skilled in the art are intended to be included.

I claim:

1. A method for manufacturing a semiconductor diode comprising the steps of:
   - epitaxially growing a first semiconductor layer having a low-impurity concentration of a first conductivity type on a surface of a semiconductor substrate having a high-impurity concentration of a second conductivity type opposite to the first conductivity type;
   - forming a second semiconductor layer having a high-impurity concentration of the second conductivity type at the surface of said first semiconductor layer;
   - heating the thus produced combination to cause the second conductivity type determining impurities contained in said substrate and the second semiconductor layer to be diffused into said first semiconductor layer, whereby the conductivity type of said first semiconductor layer is converted to the second conductivity type;
   - forming a third semiconductor layer having a high-impurity concentration of the first conductivity type at the surface of said second semiconductor layer; and
   - contacting metal electrodes contacts to the surface of said third semiconductor layer and said substrate.

2. The method according to claim 1, wherein said substrate has a specific resistance not more than 0.02 ohm-cm., said first semiconductor layer has a specific resistance of 0.5 to 3.0 ohm-cm. and a thickness of 1.0 to 5.0 microns, and said second semiconductor layer has a specific resistance of 0.6 to 0.001 ohm-cm.

3. The method according to claim 1, wherein said substrate is made of N-type silicon.

4. A method according to claim 1, wherein said second semiconductor layer is formed by epitaxially depositing said second semiconductor layer on the surface of said first semiconductor layer.

5. A method according to claim 1, wherein said second semiconductor layer is formed by diffusing said second semiconductor layer into the surface of said first semiconductor layer.

6. A method according to claim 4, wherein said third semiconductor layer is formed by diffusing said third semiconductor layer into the surface of said second semiconductor layer.

7. A method according to claim 3, wherein said N-type substrate has an impurity concentration of not less than $2\times10^{18}$ atoms/cm.$^3$.

8. A method according to claim 7, wherein said second semiconductor layer is made of P-type silicon having an impurity concentration of $3\times10^{15}$ to $4\times10^{16}$ atoms/cm.

* * * * *